United States Patent
Huang et al.

(10) Patent No.: US 10,243,830 B2
(45) Date of Patent: Mar. 26, 2019

(54) SOFTWARE DEFINED NETWORK-BASED GATEWAY MIGATION PROCESSING

(71) Applicant: HANGZHOU H3C TECHNOLOGIES CO., LTD., Zhejiang (CN)

(72) Inventors: Liwei Huang, Beijing (CN); Hai Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 77 days.

(21) Appl. No.: 15/324,978

(22) PCT Filed: Jul. 8, 2015

(86) PCT No.: PCT/CN2015/083575
§ 371 (c)(1),
(2) Date: Jan. 9, 2017

(87) PCT Pub. No.: WO2016/004874
PCT Pub. Date: Jan. 14, 2016

(65) Prior Publication Data
US 2017/0207992 A1    Jul. 20, 2017

(30) Foreign Application Priority Data

Jul. 9, 2014   (CN) .......................... 2014 1 0325755

(51) Int. Cl.
*H04L 12/26* (2006.01)
*H04L 12/64* (2006.01)
(Continued)

(52) U.S. Cl.
CPC .......... *H04L 43/50* (2013.01); *G06F 9/45504* (2013.01); *H04L 12/4633* (2013.01);
(Continued)

(58) Field of Classification Search
CPC .. H04L 43/50; H04L 12/4633; H04L 12/4641
See application file for complete search history.

(56) References Cited

U.S. PATENT DOCUMENTS

2013/0266015 A1    10/2013  Qu et al.
2014/0244814 A1*    8/2014  Kuzmack .......... H04L 29/06006
                                                              709/223
(Continued)

FOREIGN PATENT DOCUMENTS

CN      101022328 A    8/2007
CN      102546351 A    7/2012
(Continued)

OTHER PUBLICATIONS

International Search Report and Written Opinion, International Application No. PCT/CN2015/083575, dated Sep. 2, 2015, pp. 1-8, SIPO.

(Continued)

*Primary Examiner* — Mohammad S Anwar
(74) *Attorney, Agent, or Firm* — Hewlett Packard Enterprise Patent Department (57) ABSTRACT

Priority of a route, which carries a virtual extensible local area network (VXLAN) tunneling end point (VTEP) Internet protocol (IP) address of a port of a VXLAN tunnel corresponding to a first VXLAN IP GW to be migrated, is lowered. The route is then released to a VTEP at peer end of the VXLAN tunnel. Priority of a static route destined for a virtual machine (VM) is also lowered. The static route is then released to a network device in a non-virtual network. At least two VXLAN IP GWs possess a same VTEP IP address of a port of a VXLAN tunnel. Before priority of route corresponding to first VXLAN IP GW is lowered, priority of route carrying the same VTEP IP address released by each of at least two VXLAN IP GWs is same. Priority of static route from each of at least two VXLAN IP GWs to the (Continued)

VM is same. When controller monitors no data flow between VM and network device in the non-virtual network passes the first VXLAN IP GW, migration actions may be executed.

11 Claims, 5 Drawing Sheets

(51) Int. Cl.
    *G06F 9/455*     (2018.01)
    *H04L 12/46*     (2006.01)
    *H04L 12/66*     (2006.01)
    *H04L 29/12*     (2006.01)

(52) U.S. Cl.
    CPC ...... *H04L 12/4641* (2013.01); *H04L 12/6418* (2013.01); *H04L 12/66* (2013.01); *H04L 61/2007* (2013.01); *H04L 61/2592* (2013.01); *H04L 2012/6464* (2013.01)

(56) References Cited

U.S. PATENT DOCUMENTS

| | | | | |
|---|---|---|---|---|
| 2014/0269333 A1* | 9/2014 | Boerjesson | ........... | H04L 45/123 370/238 |
| 2014/0376550 A1* | 12/2014 | Khan | ...................... | H04L 45/74 370/392 |
| 2015/0372869 A1* | 12/2015 | Rao | ........................ | H04L 61/103 709/224 |
| 2015/0381495 A1* | 12/2015 | Cherian | ................ | H04L 45/745 370/392 |

FOREIGN PATENT DOCUMENTS

| | | | |
|---|---|---|---|
| CN | 102821023 | A | 12/2012 |
| CN | 103200094 | A | 7/2013 |

OTHER PUBLICATIONS

International Preliminary Report on Patentability received for PCT Patent Application No. PCT/CN2015/083575, dated Jan. 19, 2017, 5 pages.

\* cited by examiner

SOFTWARE DEFINED NETWORK-BASED GATEWAY MIGRATION PROCESSING

BACKGROUND

At present, the internal layout of large data centers (DCs) may employ layout of a large layer two network. Large layer two technologies are mainly overlay technologies. A large layer two network may communicate with a layer three network. Thus, a gateway (GW) supporting forwarding between layer two and layer three may be deployed on the edge of a software defined network (SDN), to enable the SDN to communicate with an external layer three network.

DETAILED DESCRIPTIONS

The following examples of the present disclosure provide an SDN-based GW migration processing method, and a device which may use such method.

Figure 1:
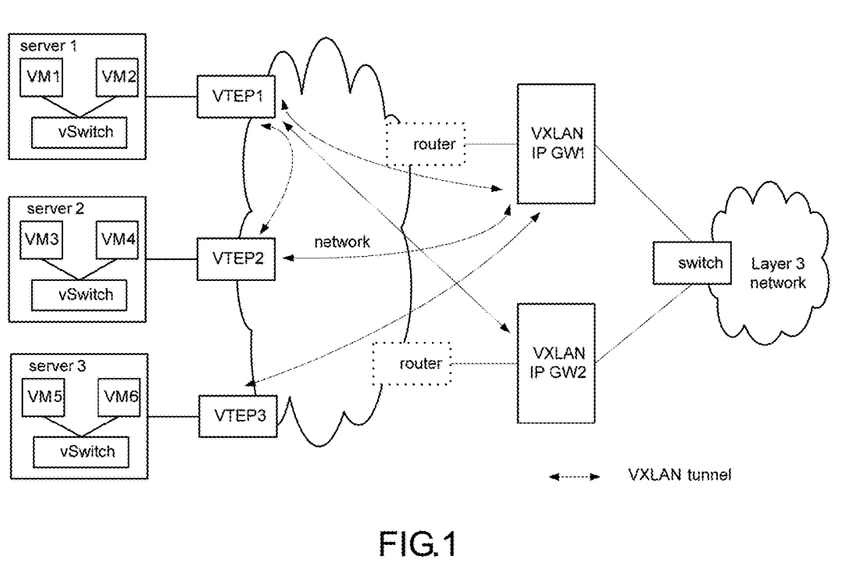
FIG. 1 is a schematic diagram illustrating a network structure combining a virtual extensible local area network (VXLAN) with an SDN, to which a GW migration processing method is applicable, in accordance with an example of the present disclosure.

The method and device provided by the foregoing examples of the present disclosure may be applicable to a network structure combining VXLAN with SDN, as shown in FIG. 1.

As shown in FIG. 1, the SDN may include a controller (not shown in FIG. 1), a server, a VXLAN tunneling end point (VTEP) and N (N is a natural number greater than or equal to 2) VXLAN IP GWs (take two VXLAN IP GWs in FIG. 1 as an example). The server may include a virtual machine (VM), and vSwitch connected thereto. A VXLAN tunnel may be established between VTEP and VXLAN IP GW. The server may be connected with the VXLAN IP GW through the VTEP. The VXLAN IP GW may be connected with the VXLAN network at one end, and connected with a layer three network (e.g., a non-virtual network) at the other end. The overlay network in various examples of the present disclosure may include a virtual network and a non-virtual network. Layer two interworking of VMs in the virtual network may be achieved through the VXLAN, so as to implement exchange of visits among internal VMs in the virtual network. By using layer three routes, exchange of visits among internal servers in the non-virtual network may be implemented by servers in the non-virtual network. However, exchange of visits between the virtual network and the non-virtual network may be implemented by using the VXLAN IP GW, which connects with a network device in the non-virtual network, such as a switch, so as to implement data communication between the VM and the non-virtual network. The controller may perform relevant configurations to other devices in the SDN.

In practical applications, to implement load sharing and high reliability of VXLAN IP GW, stateless GW functions may be generally implemented by using at least two VXLAN IP GWs. That is, at least two VXLAN IP GWs may be employed to connect the VXLAN network with the non-virtual network. Take FIG. 1 as an example, suppose the IP address of VTEP1 is 2.2.2.2, the controller may configure a same VTEP IP address and a same media access control (MAC) address for VXLAN IP GW1 and VXLAN IP GW2. The controller may also configure a static route to the VM with a same cost value for both VXLAN IP GW1 and VXLAN IP GW2. The foregoing VTEP IP address may be, but not limited to, a loop back port's address. Besides, suppose the VTEP IP address and MAC address configured by the controller for VXLAN IP GW1 is respectively 1.1.1.1 and 1-1-1. VXLAN IP GW2 may be assigned with the same VTEP IP address and MAC address. When a tunnel is to be established between VTEP1 and a device with a destination IP address 1.1.1.1, VTEP1 may establish a tunnel. Two egress ports of the tunnel are respectively VXLAN IP GW1 and VXLAN IP GW2.

In addition, for VTEP1, VTEP2, VTEP3 and switches in the non-virtual network of FIG. 1, the VXLAN IP GW1 and VXLAN IP GW2, which are assigned with the same VTEP IP address and the same MAC address, may be taken as one device.

Load sharing of data flow between VM and non-virtual network may be implemented by VXLAN IP GW1 and VXLAN IP GW2 in the same VXLAN, after being configured as mentioned above. And then, stateless GW functions may be implemented.

VXLAN IP GW1 and VXLAN IP GW2, both of which are configured with the stateless GW functions, may respectively release the VTEP IP address thereof (referred to as IP1 for convenience) to VTEP1, VTEP2 and VTEP 3, by using a route protocol, such as border gateway protocol (BGP). Cost value of released route is the same. Besides, VXLAN IP GW1 and VXLAN IP GW2 may respectively release a static route therefrom destined for the VM to a network device in the non-virtual network, such as a switch.

After receiving the VTEP IP address, i.e., IP1, from either one of VXLAN IP GW1 and VXLAN IP GW2, any of VTEP1, VTEP2 and VTEP3 may establish a route destined for IP1. Thus, two equivalent routes destined for IP1 may be obtained by any of VTEP1, VTEP2 and VTEP3.

After receiving the static route to the VM released by either one of VXLAN IP GW1 and VXLAN IP GW2, the network device in the non-virtual network may establish a route from the network device to the VM. Thus, two equivalent routes from the network device to the VM may be obtained.

During the process of transmitting a packet from the VM to the non-virtual network, after receiving a data packet from the VM, any VTEP (take VTEP1 as an example) may select a route from the equivalent routes between VTEP1 and IP1, and forward the data packet to a corresponding VXLAN IP GW. Thus, load sharing of data flow from the VM to the non-virtual network may be implemented. During the data communication process from the non-virtual network to the VM, after receiving a data packet destined for the VM, the network device in the non-virtual network may select a route from the equivalent routes therefrom destined for the VM, and forward the data packet to a corresponding VXLAN IP GW. Thus, load sharing of data flow from the non-virtual network to the VM may be implemented.

As mentioned above, after forming the network structure illustrated with FIG. 1, the controller in the SDN may configure the same VTEP IP address for each VXLAN IP GW, and configure a priority for releasing the route with the VTEP IP address. The priority configured for each VXLAN IP GW is the same, which may be referred to as a second priority for convenience. Moreover, the controller may also configure for each VXLAN IP GW a static route with the same priority to the VM. To facilitate descriptions, the priority of the static route destined for the VM may be referred to as a fourth priority. In practical applications, priority may be reflected by cost value. Specifically, the priority may be lower, accompanying with a greater cost value, which is not limited by various examples of the present disclosure.

Each VXLAN IP GW may release the VTEP IP address of the VXLAN tunnel's port thereon to the VTEP at the peer end of the tunnel, in the form of route. Priority of released route is the same, which may be the second priority. Besides, each VXLAN IP GW may release a static route therefrom destined for the VM to a network device in the non-virtual network. Priority of the static route may be the fourth priority.

After receiving the route to the VTEP IP address of the port of the VXLAN tunnel corresponding to the VTEP, which is released by any VXLAN IP GW (e.g., VXLAN IP GW1), the VTEP may establish a route therefrom destined for the VTEP IP address through VXLAN IP GW1, after calculating routes. Since priority of route carrying the VTEP IP address released by each VXLAN IP GW is the same, the VTEP may establish N equivalent routes therefrom destined for the VTEP IP address through different VXLAN IP GWs of the N VXLAN IP GWs. That is, next hop of each of the N routes is respectively a different VXLAN IP GW of the N VXLAN IP GWs.

After receiving the static route released by any VXLAN IP GW (e.g., VXLAN IP GW1) therefrom destined for the VM, the network device in the non-virtual network may establish a route therefrom destined for the VM through VXLAN IP GW1, after calculating routes. Since priority of static route released by each VXLAN IP GW is the same, the network device may finally establish N equivalent routes therefrom destined for the VM through different VXLAN IP GWs in the N VXLAN IP GWs. That is, next hop of each of the N routes to the VM is respectively a different VXLAN IP GW in the N VXLAN IP GWs.

In addition, the controller may issue to the vSwitch of the server N flow table items, which are from the VM to the network device (i.e., switch device) in the non-virtual network. Destination IP address in a different flow table item is respectively an IP address of a port of the network device connecting with a different VXLAN IP GW. Next hop of each flow table item is the VTEP connecting with the server.

Thus, data communication may be executed between the VM and non-virtual network.

It is obvious that the controller may also perform other relevant configurations to the VM, vSwitch, VTEP, VXLAN IP GW, which is not limited by various examples of the present disclosure.

Figure 2:
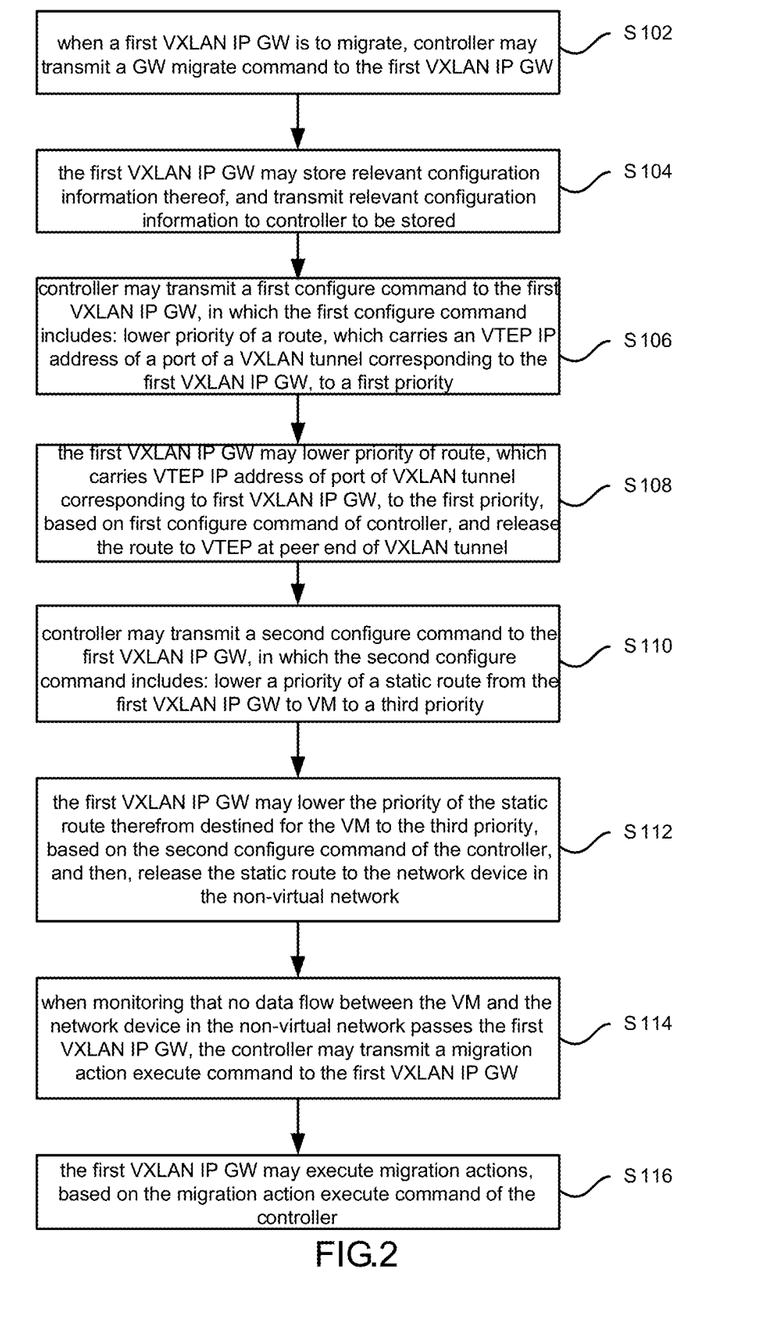
FIG. 2 is a flowchart illustrating an SDN-based GW migration processing method, in accordance with an example of the present disclosure.

When any VXLAN IP GW (which may be referred to as a first VXLAN IP GW for convenience) in the N VXLAN IP GWs is to migrate (e.g., leave the SDN, or, re-join the SDN after leaving the SDN), for example, the first VXLAN IP GW is to migrate due to device upgrade, device migrate, device expansion, and device replacement, at this time, the SDN-based GW migration processing method provided by various examples of the present disclosure may include the following blocks, as shown in FIG. 2.

In S102, when the first VXLAN IP GW is to migrate, the controller may issue a GW migrate command to the first VXLAN IP GW.

In S104, the first VXLAN IP GW may store relevant configuration information thereof, and transmit the relevant configuration information to the controller to be stored. The relevant configuration information may include, but may be not limited to, priority of a route carrying an VTEP IP address of a port of a VXLAN tunnel corresponding to the first VXLAN IP GW, and priority of a static route from the first VXLAN IP GW to the VM.

In S106, the controller may transmit a first configure command to the first VXLAN IP GW. The first configure command may include: lower the priority of the route carrying the VTEP IP address of the port of the VXLAN tunnel corresponding to the first VXLAN IP GW. To facilitate descriptions, the lowered priority may be referred to as a first priority.

It is obvious that priority of the first priority is lower than that of the second priority.

In practical applications, the controller may employ various modes to transmit configure commands to the first VXLAN IP GW. For example, after receiving a configure command from a user, the controller may write the configure command to an extensible markup language (XML) file, and then call a Netconf tool to parse the configure command in the XML file into a format recognizable by the VXLAN IP GW, and transmit to the first VXLAN IP GW. After receiving the configure command, the first VXLAN IP GW may replace corresponding configuration thereof with contents in the received configure command.

In S108, based on the first configure command of the controller, the first VXLAN IP GW may lower the priority of the route carrying the VTEP IP address of the port of the VXLAN tunnel corresponding to the first VXLAN IP GW, and then, release the route to the VTEP at the peer end of the tunnel.

Thus, after receiving the route released by the first VXLAN IP GW, which carries the VTEP IP address of the port of the VXLAN tunnel corresponding to the first VXLAN IP GW, the VTEP at the peer end of the tunnel may re-calculate routes, and replace previous N equivalent routes, which are from the VTEP to the VTEP IP address through different VXLAN IP GWs in the N VXLAN IP GWs, with (N-1) equivalent routes, which are from the VTEP to the VTEP IP address through different VXLAN IP GWs in the N VXLAN IP GWs except for the first VXLAN IP GW. That is, next hop of each of the (N-1) routes destined for the VTEP IP address is respectively a different VXLAN IP GW except for the first VXLAN IP GW. Thus, when data flow from the VM to the non-virtual network passing the VTEP, the VTEP may select a route from the (N-1) routes destined for the VTEP IP address to forward the data flow, instead of forwarding the data flow to the network device in the non-virtual network through the first VXLAN IP GW.

In S110, the controller may transmit a second configure command to the first VXLAN IP GW. The second configure command may include: lower the priority of the static route from the first VXLAN IP GW to the VM. To facilitate descriptions, the lowered priority may be referred to as a third priority.

It is obvious that priority of the third priority is lower than that of the fourth priority.

In S112, the first VXLAN IP GW may lower the priority of the static route therefrom destined for the VM to be the third priority, based on the second configure command of the controller, and then, release the static route to the network device in the non-virtual network.

Thus, after receiving the static route released by the first VXLAN IP GW, the network device may re-calculate routes, update previous N equivalent routes, which are from the network device to the VM through different VXLAN IP GWs in the N VXLAN IP GWs, to be (N-1) equivalent routes, which are from the network device to the VM through different VXLAN IP GWs except for the first VXLAN IP GW. That is, next hop of each of the (N-1) routes to the VM is respectively a different VXLAN IP GW except for the first VXLAN IP GW. Thus, when data flow from the non-virtual network to the VM passing the network device, the network device may select a route from the (N-1) routes to forward the data flow, instead of forwarding the data flow to the VM through the first VXLAN IP GW to be migrated.

In S114, when monitoring that no data flow between the VM and the network device in the non-virtual network passes the first VXLAN IP GW, the controller may transmit a migration action execute command to the first VXLAN IP GW.

In practical applications, the controller may employ various modes to monitor whether there is data flow passing the first VXLAN IP GW, in which the data flow is between the VM and the network device in the non-virtual network. For example, one mode is to monitor flow of each port of the first VXLAN IP GW, which is not limited by various examples of the present disclosure. Specifically, the controller may transmit a monitor command to the first VXLAN IP GW. After receiving the monitor command, the first VXLAN IP GW may report flow of each port thereof to the controller. After receiving the report from the first VXLAN IP GW, the controller may make a statistics on data flow between the VM and the network device in the non-virtual network, based on actual requirements, and display the data flow.

In S116, the first VXLAN IP GW may execute migration actions, based on the migration action execute command of the controller.

In practical applications, either one of foregoing S106 and S110 may be executed firstly.

Figure 3:
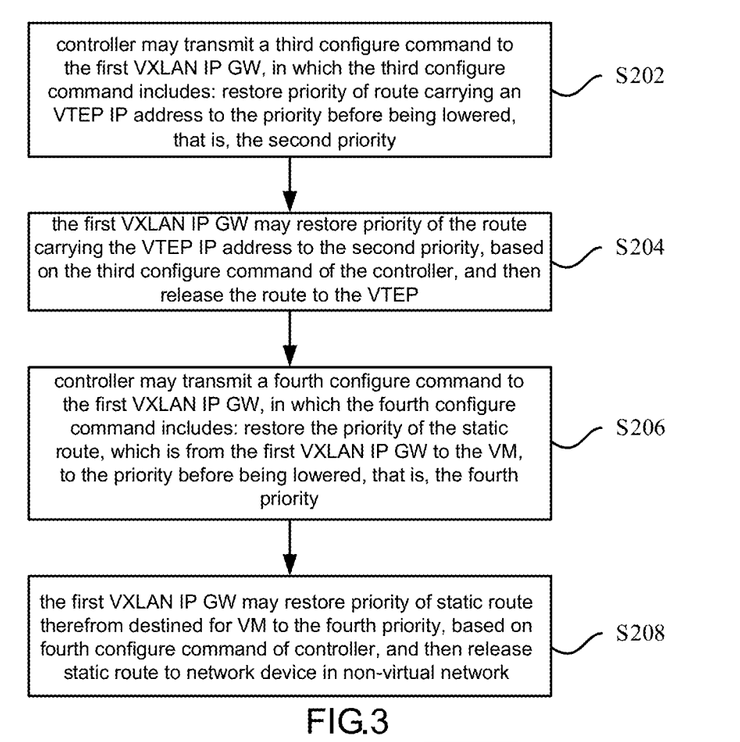
FIG. 3 is a flowchart illustrating a GW migration processing method after a first VXLAN Internet protocol (IP) GW completes migration actions, in accordance with an example of the present disclosure.

In addition, as shown in FIG. 3, when the first VXLAN IP GW completes migration actions and re-joins the SDN, the SDN-based GW migration processing method may include the following blocks.

In S202, a controller may transmit a third configure command to the first VXLAN IP GW. The third configure command may include: restore priority of the route carrying the VTEP IP address of the port of the VXLAN tunnel, which corresponds to the first VXLAN IP GW, to be the priority before being lowered, that is, the second priority.

Since the controller has stored relevant configuration information of the first VXLAN IP GW before migration, which includes priority of the route carrying the VTEP IP address of the port of the VXLAN tunnel corresponding to the first VXLAN IP GW, and priority of the static route from the first VXLAN IP GW to the VM, S202 and S206 may be executed.

In S204, based on the third configure command of the controller, the first VXLAN IP GW may restore the priority of the route carrying the VTEP IP address of the port of the VXLAN tunnel, which corresponds to the first VXLAN IP GW, to the second priority, and then, release the route to the VTEP at the peer end of the VXLAN tunnel.

Thus, after receiving the route, the VTEP at the peer end of the VXLAN tunnel may re-calculate routes, update the previous (N-1) equivalent routes, which are from the VTEP to the VTEP IP address through different VXLAN IP GWs in the N VXLAN IP GWs except for the first VXLAN IP GW, to be N equivalent routes, which are from the VTEP to the VTEP IP address through different VXLAN IP GWs in the N VXLAN IP GWs. Subsequently, when data flow from the VM to the non-virtual network passing the VTEP, the VTEP may select a route from the N routes to forward the data flow. And then, after the first VXLAN IP GW completes migration, the data flow from the VM to the non-virtual network may be forwarded once again to the network device in the non-virtual network through the first VXLAN IP GW.

In S206, the controller may transmit a fourth configure command to the first VXLAN IP GW. The fourth configure command may include: restore the priority of the static route from the first VXLAN IP GW to the VM to the priority before being lowered, that is, the fourth priority.

In S208, the first VXLAN IP GW may restore the priority of the static route from the first VXLAN IP GW to the VM to the fourth priority, based on the fourth configure command of the controller, and then, release the static route to the network device in the non-virtual network.

Thus, after receiving the static route, the network device in the non-virtual network may re-calculate routes, update previous (N-1) equivalent routes, which are from the network device to the VM through different VXLAN IP GWs in the N VXLAN IP GWs except for the first VXLAN IP GW, to N equivalent routes, which are from the network device to the VM through different VXLAN IP GWs in the N VXLAN IP GWs. Subsequently, when the data flow from the non-virtual network to the VM passing the network device, the network device may select a route from the N routes to forward the data flow. And then, after the first VXLAN IP GW completes migration, the data flow from the non-virtual network to the VM may be forwarded once again through the first VXLAN IP GW.

The first, second, third and fourth priorities are named to facilitate descriptions, which do not demonstrate sequence. Similarly, the first, second, third and fourth configure commands are also named to facilitate descriptions.

Figure 4:
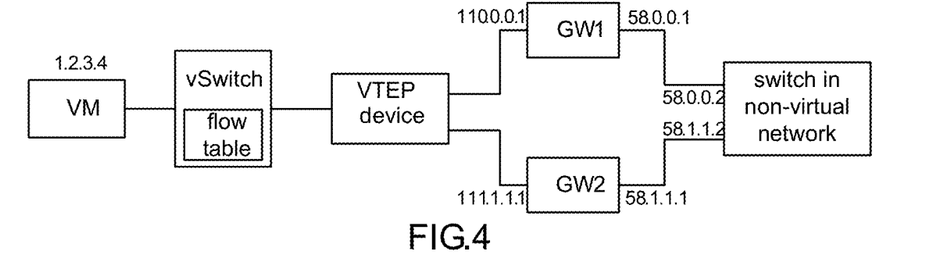
FIG. 4 is a schematic diagram illustrating an actual SDN-based network structure, in accordance with an example of the present disclosure.

The method in the foregoing example may be described in detail, by taking the simplified network structure in FIG. 4 as an example. In various examples of the present disclosure, the network device in the non-virtual network may be, but not limited to, a switch. As shown in FIG. 4, the IP address of VM is 1.2.3.4. The IP address of a port of the VXLAN tunnel connecting with the VTEP on VXLAN IP GW1 is 110.0.0.1. The IP address of a port of VXLAN IP GW1 connecting with a network device in the non-virtual network, such as a switch, is 58.0.0.1. The IP address of a port of the VXLAN tunnel connecting with the VTEP on VXLAN IP GW2 is 111.1.1.1. The IP address of a port of VXLAN IP GW2 connecting with the switch in the non-virtual network is 58.1.1.1. The IP address of a port of the switch in the non-virtual network connecting with VXLAN IP GW1 is 58.0.0.2. The IP address of a port on the switch in the non-virtual network connecting with VXLAN IP GW2 is 58.1.1.2.

1. The controller may respectively configure a static route to VM 1.2.3.4 for VXLAN IP GW1 and VXLAN IP GW2 as follows.

| Destination/Mask | Proto | Pre | Cost | NextHop | Interface |
|---|---|---|---|---|---|
| 1.2.3.0/24 | Static | 60 | 0 | 0.0.0.0 | NULL0 | ip route-static 1.2.3.0 24 NULL0 description from controller

VXLAN IP GW1 and VXLAN IP GW2 may respectively release a static route therefrom destined for the VM to the switch in the non-virtual network, by using a route protocol. After receiving the static route, the switch may establish two equivalent routes therefrom destined for VM 1.2.3.4 as follows.

dis ip routing-table 1.2.3.4
Summary Count: 2

| Destination/Mask | Proto | Pre | Cost | NextHop | Interface |
|---|---|---|---|---|---|
| 1.2.3.0/24 | OSPF | 150 | 1 | 58.0.0.1 | GE1/0/1 |
|  |  |  |  | 58.1.1.1 | XGE1/0/49 |

Based on the foregoing routes, it can be seen that the next hop of the two routes from the switch to VM 1.2.3.4 is respectively VXLAN IP GW1 and VXLAN IP GW2. Thus, when the data flow from the non-virtual network to VM 1.2.3.4 passes the switch, the switch may select VXLAN IP GW1 or VXLAN IP GW2 to forward the data flow to the VM.

The controller may issue two flow table items to vSwitch, the destination IP addresses thereof are respectively 58.0.0.2 and 58.1.1.2. The next hop of either flow table item is the VTEP, which is shown in Table 1 as follows.

TABLE 1

| ingress port | destination MAC address | source MAC address | Ethernet type | source IP address | destination IP address | action |
|---|---|---|---|---|---|---|
| XX | XX | XX | IPv4 | 1.2.3.4 | 58.0.0.2 | the egress port is a port on vSwitch connecting with VTEP |
| XX | XX | XX | IPv4 | 1.2.3.4 | 58.1.1.2 | the egress port is a port on vSwitch connecting with VTEP |

Thus, the data flows destined for the non-virtual network may be forwarded through the VTEP.

The controller may start the stateless GW functions of VXLAN IP GW1 and VXLAN IP GW2. Besides, the controller may configure the same VTEP IP address, 125.125.125.125, for VXLAN IP GW1 and VXLAN IP GW2, and configure the same cost value for subsequently releasing the route of 125.125.125.125, such as 0. VXLAN IP GW1 and VXLAN IP GW2 may respectively release 125.125.125.125 to the VTEP device through BGP, and both of the cost values of the released routes are 0. After receiving the VTEP IP address 125.125.125.125 with cost value respectively released by VXLAN IP GW1 and VXLAN IP GW2, the VTEP may establish two equivalent routes destined for 125.125.125.125 as follows.

dis ip routing-table 125.125.125.125
Summary Count: 2

| Destination/Mask | Proto | Pre | Cost | NextHop | Interface |
|---|---|---|---|---|---|
| 125.125.125.125/32 | BGP | 255 | 0 | 110.0.0.1 | Vlan100 |
|  |  |  |  | 111.1.1.1 | XGE1/0/47 |

Based on the foregoing routes, it can be seen that next hop of either route from the VTEP to 125.125.125.125 is respectively VXLAN IP GW1 and VXLAN IP GW2. Thus, when the data flow coming from VM 1.2.3.4 passes the VTEP, the VTEP may select VXLAN IP GW1 or VXLAN IP GW2 to forward the data flow to the non-virtual network.

2. When VXLAN IP GW1 is to migrate, the controller may perform the following configurations to VXLAN IP GW1, before VXLAN IP GW1 migrates.

A. Modify the cost value of the static route from VXLAN IP GW1 to the VM. Modified cost value is greater than 0. For example, modified cost value may be 1. Since priority may be lower, accompanying with a greater cost value, at this time, the priority of static route from VXLAN IP GW1 to VM 1.2.3.4 is lower than that from VXLAN IP GW2 to VM 1.2.3.4.

After receiving the foregoing configurations, VXLAN IP GW1 may re-release the static route therefrom destined for VM 1.2.3.4 to the switch in the non-virtual network. After receiving the static route, the switch may re-calculate routes, and update previous two equivalent routes destined for VM 1.2.3.4 as follows.

dis ip routing-table 1.2.3.4
Summary Count: 1

| Destination/Mask | Proto | Pre | Cost | NextHop | Interface |
|---|---|---|---|---|---|
| 1.2.3.0/24 | OSPF | 150 | 0 | 58.1.1.1 | XGE1/0/49 |

Based on the updated route, it can be seen that, no equivalent route exists on the switch of the non-virtual network therefrom destined for VM 1.2.3.4. When data flow from the non-virtual network to the VM passes the switch, the switch may transmit the data flow to VM 1.2.3.4 through VXLAN IP GW2, instead of selecting a route destined for VM 1.2.3.4 through VXALN IP GW1 with a lower priority.

B. Modify the cost value of BGP route, which is used for releasing the VTEP IP address 125.125.125.125 by VXLAN IP GW1. The modified cost value may be greater than 0. For example, the modified cost value may be 1. The priority may be lower, accompanying with a greater cost value. At this time, the priority of the BGP route, which is used for releasing the VTEP IP address 125.125.125.125 by VXLAN IP GW1, is lower than that used for releasing the VTEP IP address 125.125.125.125 by VXLAN IP GW2.

After receiving the foregoing configurations, VXLAN IP GW1 may re-release the VTEP IP address 125.125.125.125 to the VTEP, by using the BGP route. Cost value of the BGP route may be 1. After receiving the BGP route, the VTEP may re-calculate routes, and update previous two equivalent routes destined for VTEP IP address 125.125.125.125 as follows.

dis ip routing-table 125.125.125.125
 Summary Count: 1

| Destination/Mask | Proto | Pre | Cost | NextHop | Interface |
|---|---|---|---|---|---|
| 125.125.125.125/32 | BGP | 255 | 0 | 111.1.1.1 | XGE1/0/47 |

Based on the updated route, it can be seen that, no equivalent route from the VTEP to VTEP IP address 125.125.125.125 exists on the VTEP. When data flow from the VM to the non-virtual network passes the VTEP, the VTEP may transmit the data flow to VTEP IP address 125.125.125.125 through VXLAN IP GW2, instead of selecting a lower-priority route destined for VTEP IP address 125.125.125.125 through VXLAN IP GW1.

3. After re-releasing the route by VXLAN IP GW1, bidirectional data flow between the VM and the non-virtual network may be forwarded through VXLAN IP GW2. However, since some time may be consumed during route convergence, some data flow may also be forwarded through VXLAN IP GW1. The data flow between the VM and the non-virtual network, which passes VXLAN IP GW1, may be monitored. When monitoring that no data flow between the VM and the non-virtual network passes VXLAN IP GW1, it may denote that the data flow has already been switched to VXLAN IP GW2. At this time, the controller may indicate VXLAN IP GW1 to migrate. That is, the controller may transmit configuration information for executing migration actions to VXALN IP GW1. After receiving the configuration information, VXLAN IP GW1 may execute migration actions.

When VXLAN IP GW1 completes the migration, the controller may also perform the following configurations to VXLAN IP GW1.

First of all, the controller may start the stateless GW functions for VXLAN IP GW1, configure VXLAN IP GW1 with the VTEP IP address 125.125.125.125, configure cost value of BGP route used for releasing VTEP IP address 125.125.125.125 to be 0, configure static route from VXLAN IP GW1 to VM 1.2.3.4, in which cost value of the static route is 0, and so on.

VXLAN IP GW1 may re-release the VTEP IP address 125.125.125.125 to the VTEP by using the BGP route. Cost value of the BGP route may be 0. Thus, the VTEP may update previous one route, which is from the VTEP to VTEP IP address 125.125.125.125 through VXLAN IP GW2, to two equivalent routes destined for VTEP IP address 125.125.125.125. Next hop of the two equivalent routes are respectively VXLAN IP GW1 and VXLAN IP GW2. Besides, VXLAN IP GW1 may re-release the static route to VM 1.2.3.4 to the switch in the non-virtual network, to enable the switch to update previous one route, which is from the switch to VM 1.2.3.4 through VXLAN IP GW2, to two equivalent routes destined for VM 1.2.3.4. Next hop of the two equivalent routes are respectively VXLAN IP GW1 and VXLAN IP GW2. Thus, VXLAN IP GW1 and VXLAN IP GW2 may re-implement load sharing, after VXLAN IP GW1 completes migration.

Regarding the method in the foregoing example, various examples of the present disclosure also provide an SDN-based GW migration processing device, which may use the foregoing method.

Figure 5:
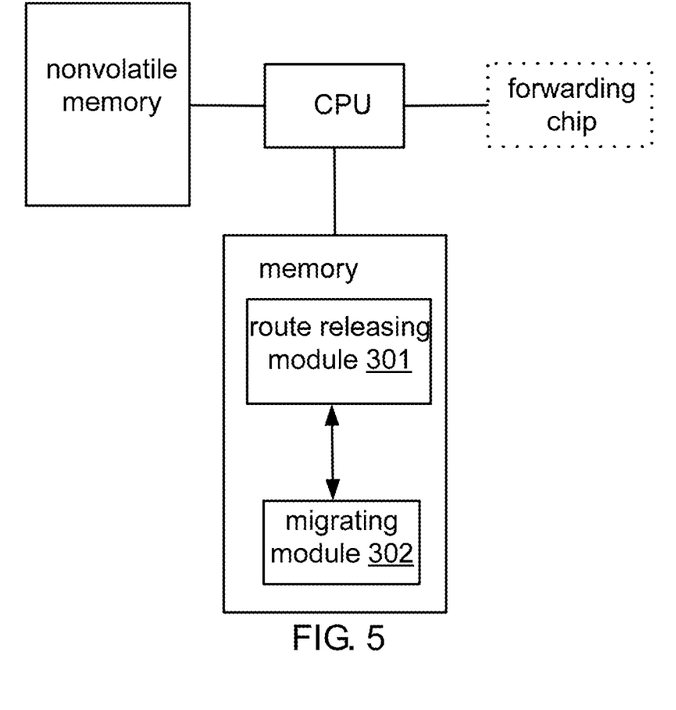
FIG. 5 is a schematic diagram illustrating hardware structure of a first VXLAN IP GW including a GW migration processing device, in accordance with an example of the present disclosure.

In various examples of the present disclosure, the first VXLAN IP GW may be a programmable device with a combination of machine readable instructions and hardware. From the aspect of hardware, with reference to FIG. 5, FIG. 5 is a schematic diagram illustrating hardware structure of a GW migration processing device, which includes a first VXLAN IP GW, in accordance with an example of the present disclosure. The first VXLAN IP GW may include a non-transitory storage medium, such as a memory, optical or magnetic drive etc., and a processor such as a central processing unit (CPU). The non-transitory storage medium may store machine readable instructions that are executable by the processor to perform the methods described above.

The computer executable instructions may include a route releasing module 301 and a migrating module 302 of the SDN-based GW migration processing device, which is included in the first VXLAN IP GW.

The first VXLAN IP GW shown in FIG. 5 may further include a forwarding chip.

The CPU is further to communicate with the forwarding chip, receive and transmit various data. For example, the CPU may transmit a route carrying the VTEP IP address of a port of a VXLAN tunnel, which corresponds to the first VXLAN IP GW, to the VTEP at the peer end of the tunnel. The CPU may further transmit a static route, which is from the first VXLAN IP GW to the VM, to the network device in the non-virtual network, receive various commands from the controller, such as a GW migrate command, various configure commands, migration action execute command. The CPU may further communicate with the non-transitory storage medium to read and execute the machine readable instructions stored therein, complete functions of the GW migration processing device, and process commands received from the forwarding chip, such as GW migrate command, various configure commands and migration action execute command.

The forwarding chip is further to receive and transmit various data. For example, the forwarding chip may transmit the route received from the CPU, which carries the VTEP IP address of the port of the VXLAN tunnel corresponding to the first VXLAN IP GW, to the VTEP at the peer end of the VXLAN tunnel. The forwarding chip may further transmit the static route, which is from the first VXLAN IP GW to the VM, to the network device in the non-virtual network. The forwarding chip may further transmit various commands, such as the GW migrate command, various configure commands, the migration action execute command, received from the controller to the CPU.

From the aspect of machine readable instructions, the GW migration processing device applied in the first VXLAN IP GW may include the route releasing module 301 and the migrating module 302.

The route releasing module 301 is to lower priority of the route, which carries the VTEP IP address of the port of the VXLAN tunnel corresponding to the first VXLAN IP GW, and release the route with lowered priority to the VTEP at the peer end of the VXLAN tunnel. The route releasing module 301 may further lower the priority of the static route destined for the VM, and release the static route with lowered priority to the network device in the non-virtual network. At least two VXLAN IP GWs possess the same VTEP IP address of the port of the VXLAN tunnel. Before priority of the route corresponding to the first VXLAN IP GW is lowered, priority of route carrying the same VTEP IP address released by each of the at least two VXLAN IP GWs is the same. And, priority of static route from each of the at least two VXLAN IP GWs to the VM is the same.

The migrating module 302 is to execute migration actions, when the controller in the SDN monitors that no data flow between the VM and the network device in the non-virtual network passes the first VXLAN IP GW.

When the GW migration processing device completes migration actions and re-joins the SDN, the route releasing module 301 may further restore the priority of the route, which carries the VTEP IP address of the port of the VXLAN tunnel corresponding to the first VXLAN IP GW, to the priority before being lowered, and release the route with restored priority to the VTEP at the peer end of the VXLAN tunnel. The route releasing module 301 may further restore the priority of the static route destined for the VM to the priority before being lowered, and release the static route with restored priority to the network device in the non-virtual network.

In addition, the route releasing module 301 may include a command receiving unit, a lowering unit and a transmitting unit. The migrating module 302 may include a migration command receiving unit and a migration action executing unit.

The command receiving unit is to receive a GW migrate command, the first configure command, and the second configure command from the controller.

The lowering unit is to lower the priority of the route, which carries the VTEP IP address of port of VXLAN tunnel corresponding to the first VXLAN IP GW, based on the first configure command received by the command receiving unit. The lowering unit may further lower the priority of the static route destined for the VM, based on the second configure command received by the migration command receiving unit.

After receiving the GW migrate command by the command receiving unit from the controller, the transmitting unit may transmit relevant configuration information of the first VXLAN IP GW to the controller to be stored. After the lowering unit lowers the priority of the route, which carries the VTEP IP address of the port of the VXLAN tunnel corresponding to the first VXLAN IP GW, the transmitting unit may further release the route to the VTEP at the peer end of the VXLAN tunnel. When the lowering unit lowers the priority of the static route to the VM, the transmitting unit may further release the static route to the network device in the non-virtual network.

The migration command receiving unit may further receive the migration action execute command from the controller, when the controller detects that no data flow between the VM and the network device in the non-virtual network passes the first VXLAN IP GW.

The migration action executing unit may execute migration actions, based on the migration action execute command.

The command receiving unit may further receive a third configure command, and a fourth configure command from the controller.

Based on the third configure command received by the command receiving unit, the lowering unit may further restore the priority of the route, which carries the VTEP IP address of the port of the VXLAN tunnel corresponding to the first VXLAN IP GW, to the priority before being lowered. Based on the fourth configure command received by the command receiving unit, the lowering unit may further restore the priority of the static route destined for the VM to the priority before being lowered.

After the lowering unit restores the priority of route, which carries the VTEP IP address of the port of the VXLAN tunnel corresponding to the first VXLAN IP GW, to the priority before being lowered, the transmitting unit may further release the route to the VTEP at the peer end of the VXLAN tunnel. After the lowering unit restores the priority of the static route destined for the VM to the priority before being lowered, the transmitting unit may further release the static route to the network device in the non-virtual network.

The foregoing GW migration processing device is a logical device, which may be formed by running computer programs read by the CPU from the non-transitory storage medium into the memory. When the corresponding computer program is executed, the formed GW migration processing device may execute corresponding operations based on the foregoing method.

Figure 6:
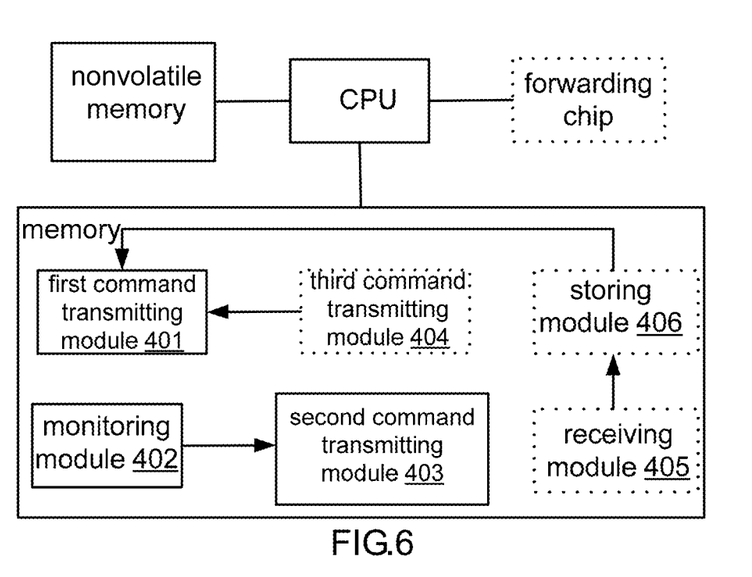
FIG. 6 is a schematic diagram illustrating hardware structure of a controller including a GW migration processing device, in accordance with an example of the present disclosure.

In addition, the controller in another example of the present disclosure may also be a programmable device, which combines machine readable instructions with hardware. From the aspect of hardware, with reference to FIG. 6, FIG. 6 is a schematic diagram illustrating hardware structure of a controller including a GW migration processing device, in accordance with an example of the present disclosure. The controller may include a non-transitory storage medium, a CPU and a memory.

The non-transitory storage medium may store machine readable instructions, which are used for implementing SDN-based GW migration processing. Operations completed by running the machine readable instructions, which are read by the CPU into the memory, are functions of the GW migration processing device in the memory.

The CPU may load the machine readable instructions of the non-transitory storage medium into the memory to be run, so as to form computer executable instructions. The computer executable instructions may be stored in a first command transmitting module 401, a monitoring module 402, and a second command transmitting module 403 of the GW migration processing device applied in the controller.

The controller shown in FIG.6 may further include a forwarding chip.

The CPU may further communicate with the forwarding chip, receive and transmit various data. For example, the CPU may transmit various commands, such as GW migrate command, various configure commands, migration action execute command, to the first VXLAN IP GW. The CPU may further receive from the first VXLAN IP GW relevant configuration information thereof. The CPU may further communicate with the non-transitory storage medium, read and execute machine readable instructions therein, complete functions of the GW migration processing device, and process relevant configuration information about the first VXLAN IP GW received from the forwarding chip.

The forwarding chip may transmit and receive various data. For example, the forwarding chip may transmit various commands received from the CPU, such as GW migrate command, various configure commands, migration action execute command, to the first VXLAN IP GW. The forwarding chip may further transmit the relevant configuration information of the first VXLAN IP GW, which is received from the first VXLAN IP GW, to the CPU.

From the aspect of machine readable instructions, the GW migration processing device applied in the controller may include the following modules, a first command transmitting module 401, a monitoring module 402 and a second command transmitting module 403.

The first command transmitting module 401 may transmit a first configure command and a second configure command to the first VXLAN IP GW, which is to migrate in the at least two VXLAN IP GWs. The first configure command may include: lower priority of the route carrying the VTEP IP address of port of the VXLAN tunnel corresponding to the first VXLAN IP GW. The second configure command may include: lower priority of the static route destined for the VM. At least two VXLAN IP GWs possess the same VTEP IP address of a port of a VXLAN tunnel. Before priority of route corresponding to the first VXLAN IP GW is lowered, priority of route carrying the same VTEP IP address, which is respectively released by each of the at least two VXLAN IP GWs, is the same. Priority of static route, which is from each of the at least two VXLAN IP GWs to the VM, is the same.

The monitoring module 402 may monitor whether there is data flow, which is between the VM and the network device in the non-virtual network, passing the first VXLAN IP GW.

When the monitoring module 402 monitors that no data flow, which is between the VM and the network device in the non-virtual network, passes the first VXLAN IP GW, the second command transmitting module 403 may transmit a migration action execute command to the first VXLAN IP GW.

After the first VXLAN IP GW completes the migration actions and re-joins the SDN, the first command transmitting module 401 may further transmit a third configure command and a fourth configure command to the first VXLAN IP GW. The third configure command may include: restore the priority of the route, which carries the VTEP IP address of the port of the VXLAN tunnel corresponding to the first VXLAN IP GW, to the priority before being lowered. The fourth configure command may include: restore the priority of the static route destined for the VM to the priority before being lowered.

Besides, the GW migration processing device may further include a third command transmitting module 404, a receiving module 405 and a storing module 406. That is, the computer executable instructions may further be stored in the third command transmitting module 404, the receiving module 405 and the storing module 406 in the GW migration processing device applied in the controller.

The third command transmitting module 404 may transmit a GW migrate command to the first VXLAN IP GW, before the first command transmitting module 401 transmits the first configure command and the second configure command to the first VXLAN IP GW.

The receiving module 405 may receive from the first VXLAN IP GW relevant configuration information thereof, after the first VXLAN IP GW receives the GW migrate command.

The storing module 406 may store the relevant configuration information of the first VXLAN IP GW, which is received by the receiving module 405.

The first command transmitting module 401 may further transmit the third configure command and the fourth configure command to the first VXLAN IP GW, based on the relevant configuration information of the first VXLAN IP GW stored by the storing module 406.

In the technical scheme provided by various examples of the present disclosure, in the SDN-based network structure, under the circumstances that load sharing is implemented by N (N is a natural number greater than or equal to 2) VXLAN IP GWs, and when a certain VXLAN IP GW (referred to as a first VXLAN IP GW) is to migrate, the controller may lower priority of the route, which carries the VTEP IP address of the port of the VXLAN tunnel corresponding to the first VXLAN IP GW, before the first VXLAN IP GW migrates. Thus, after re-releasing by the first VXLAN IP GW the route with a lowered priority, which carries the VTEP IP address, to the VTEP at the peer end of the VXLAN tunnel, the VTEP may update previous N equivalent routes, which are from the VTEP to the VTEP IP address through different VXLAN IP GWs in the N VXLAN IP GWs, to (N-1) equivalent routes, which are from the VTEP to the VTEP IP address through different VXLAN IP GWs in the N VXLAN IP GWs except for the first VXLAN IP GW. Subsequently, the data flow from the VM to the non-virtual network may not be forwarded through the first VXLAN IP GW, when passing the VTEP. In addition, before the first VXLAN IP GW migrates, the controller may also lower the priority of static route from the first VXLAN IP GW to the VM. Thus, after re-releasing by the first VXLAN IP GW the static route, which is from the first VXLAN IP GW to the VM, to the network device in the non-virtual network, the network device may update previous N equivalent routes, which are from the network device to the VM through different VXLAN IP GWs in the N VXLAN IP GWs, to (N-1) equivalent routes, which are from the network device to the VM through different VXLAN IP GWs in the N VXLAN IP GWs except for the first VXLAN IP GW. Thus, the data flow from the non-virtual network to the VM may not be forwarded by the first VXLAN IP GW, when passing the network device in the non-virtual network. After releasing the foregoing routes, data flow between the non-virtual network and the VM may be switched to the other VXLAN IP GWs to be forwarded. The first VXLAN IP GW may execute migration actions, when the controller monitors that no data flow between the VM and the network device in the non-virtual network passes the first VXLAN IP GW.

Before the first VXLAN IP GW migrates, by modifying priority of the route, which carries the VTEP IP address of the port of the VXLAN tunnel corresponding to the first VXLAN IP GW, and modifying priority of static route destined for the VM, modified priority may be lower than priority of corresponding route of other VXLAN IP GWs. Thus, the data flow, which is between the VM and the non-virtual network, may be switched to the other VXLAN IP GWs except for the first VXLAN IP GW to be forwarded. And then, the first VXLAN IP GW may migrate, so as to avoid packet loss. For example, when the first VXLAN IP GW migrates, during the process of route convergence, since VTEP may still store equivalent route therefrom to the first VXLAN IP GW, the VTEP may still forward the data packet received from the VM to the first VXLAN IP GW. Subsequently, packet loss may occur. Similarly, since the network device in the non-virtual network may still store equivalent routes therefrom destined for the VM, the network device may still forward data packets destined for the VM to the first VXLAN IP GW. And then, packet loss may still occur.

Besides, after the first VXLAN IP GW completes migration and re-joins the SDN, the controller may respectively restore priorities of routes stored by the first VXLAN IP GW. That is, restore the first priority of the route, which carries the VTEP IP address of the port of the VXLAN tunnel corresponding to the first VXLAN IP GW, to the second priority before being lowered. Restore the third priority of the static route destined for the VM to the fourth priority before being lowered. Thus, the VTEP may re-generate N equivalent routes, which are from the VTEP to the VTEP IP address through different VXLAN IP GWs including the first VXLAN IP GW. The network device in the non-virtual network may re-generate N equivalent routes, which are from the network device to the VM through different VXLAN IP GWs including the first VXLAN IP GW. Thus, N VXLAN IP GWs including the first VXLAN IP GW may re-implement load sharing.

In addition, migration of the first VXLAN IP GW may generally be implemented with a manual mode. That is, as shown in FIG. 1, when the VTEP establishes a VXLAN tunnel with a VXLAN IP GW through network, it may be manually operated on the controller to disconnect the link between the first VXLAN IP GW and router, and disconnect the link between the first VXLAN IP GW and network device in the non-virtual network. The operations are not convenient. However, by adopting the foregoing examples of the present disclosure, the controller may communicate with the first VXLAN IP GW to be migrated, so as to implement automatic controlling of migration of VXLAN IP GW, which is applicable to various SDN networking.

What is claimed is:

1. A software defined network (SDN)-based gateway migration processing method, which is applicable to a network comprising at least two virtual extensible local area network (VXLAN) internet protocol (IP) gateways (GWs), the method comprising:
    lowering a priority of a route, which carries a VXLAN tunneling end point (VTEP) IP address of a port of a VXLAN tunnel corresponding to a first VXLAN IP GW, and releasing the route to a VTEP at peer end of the VXLAN tunnel;
    lowering a priority of a static route destned for a virtual machine (VM), and releasing the static route to a network device in a non-virtual network;
    wherein the at least two VXLAN IP GWs possess a same VTEP IP address of a port of a VXLAN tunnel, before the priority of the route corresponding to the first VXLAN IP GW is lowered, the priority of the route carrying the same VTEP IP address, which is released by each of the at least two VXLAN IP GWs, is the same, and the priority of the static route from each of the at least two VXLAN IP GWs to the VM is the same;
    executing migration actions, when a controller in an SDN monitors that no data flow between the VM and the network device in the non-virtual network passes the first VXLAN IP GW.

2. The method according to claim 1, further comprising:
    after completing the migration actions and re-joining the SDN, restoring the priority of the route, which carries the VTEP IP address of the port of the VXLAN tunnel corresponding to the first VXLAN IP GW, to the priority before being lowered, and releasing the route to the VTEP at the peer end of the VXLAN tunnel, restoring the priority of the static route destined for the VM to the priority before being lowered, and releasing the static route to the network device in the non-virtual network.

3. The method according to claim 2, wherein restoring the priority of the route, which carries the VTEP IP address of the port of the VXLAN tunnel corresponding to the first VXLAN IP GW, and releasing the route to the VTEP at the peer end of the VXLAN tunnel, restoring the priority of the static route destined for the VM to the priority before being lowered, and releasing the static route to the network device in the non-virtual network, comprise:
    receiving a third configure command from the controller, restoring the priority of the route, which carries the VTEP IP address of the port of the VXLAN tunnel corresponding to the first VXLAN IP GW, to the priority before being lowered, based on the third configure command, and releasing the route to the VTEP at the peer end of the VXLAN tunnel;
    receiving a fourth configure command from the controller, restoring the priority of the static route destined for the VM to the priority before being lowered, based on the fourth configure command, and releasing the static route to the network device in the non-virtual network.

4. The method according to claim 1, wherein lowering the priority of the route, which carries the VTEP IP address of the port of the VXLAN tunnel corresponding to the first VXLAN IP GW, and releasing the route to the VTEP at the peer end of the VXLAN tunnel, lowering the priority of the static route destined for the VM, and releasing the static route to the network device in the non-virtual network, comprise:
    receiving a GW migrate command from the controller, transmitting relevant configuration information of the first VXLAN IP GW to the controller to be stored;
    receiving a first configure command from the controller, lowering the priority of the route, which carries the VTEP IP address of the port of the VXLAN tunnel corresponding to the first VXLAN IP GW, based on the first configure command, and releasing the route to the VTEP at the peer end of the VXLAN tunnel;
    receiving a second configure command from the controller, lowering the priority of the static route destined for the VM based on the second configure command, and releasing the static route to the network device in the non-virtual network;
    wherein executing the migration actions, when the controller monitors that no data flow between the VM and the network device in the non-virtual network passes the first VXLAN IP GW, comprises:
    receiving a migration action execute command from the controller, when the controller detects that no data flow between the VM and the network device in the non-virtual network passes the first VXLAN IP GW, and executing the migration actions based on the migration action execute command.

5. A non-transitory machine readable storage medium, which is applicable to a first virtual extensible local area network (VXLAN) internet protocol (IP) gateway (GW) to be migrated in at least two VXLAN IP GWs, wherein the non-transitory machine readable storage medium stores machine readable instructions that are executable by a processor to:
    lower a priority of a route, which carries a virtual extensible local area network (VXLAN) tunneling end point (VTEP) IP address of a port of a VXLAN tunnel corresponding to a first VXLAN IP GW, and release the route to an VTEP at peer end of the VXLAN tunnel, lower a priority of a static route destined for a virtual machine (VM), and release the static route to a network device in a non-virtual network;
    wherein the at least two VXLAN IP GWs possess a same VTEP IP address of a port of a VXLAN tunnel, before the priority of the route corresponding to the first VXLAN IP GW is lowered, the priority of the route carrying the same VTEP IP address, which is released by each of the first and second VXLAN IP GWs, is the same, and the priority of the static route from each of the first and second VXLAN IP GWs to the VM is the same; and
    execute migration actions, when a controller in an SDN monitors that no data flow between the VM and the network device in the non-virtual network passes the first VXLAN IP GW.

6. The non-transitory machine readable storage medium according to claim 5, further comprising instructions to, after the first VXLAN IP GW completes the migration actions and re-joins the SDN, restore the priority of the route, which carries the VTEP IP address of the port of the VXLAN tunnel corresponding to the first VXLAN IP GW, to the priority before being lowered, and release the route to the VTEP at the peer end of the VXLAN tunnel, lower the priority of the static route destined for the VM to the priority before being lowered, and releasing the static route to the network device in the non-virtual network.

7. The non-transitory machine readable storage medium according to claim 6, further comprising instructions to receive a third configure command, and a fourth configure command from the controller;
   restore the priority of the route, which carries the VTEP IP address of the port of the VXLAN tunnel corresponding to the first VXLAN IP GW, to the priority before being lowered, based on the third configure command received; restore the priority of the static route destined for the VM to the priority before being lowered, based on the fourth configure command received;
   after restoring the priority of the route, which carries the VTEP IP address of the port of the VXLAN tunnel corresponding to the first VXLAN IP GW, to the priority before being lowered, release the route to the VTEP at the peer end of the VXLAN tunnel;
   after restoring the priority of the static route destined for the VM to the priority before being lowered, release the static route to the network device in the non-virtual network.

8. The non-transitory machine readable storage medium according to claim 5, further comprising instructions to receive a GW migrate command, a first configure command and a second configure command from the controller;
   lower the priority of the route, which carries the VTEP IP address of the port of the VXLAN tunnel corresponding to the first VXLAN IP GW, based on the first configure command, and lower the priority of the static route destined for the VM, based on the second configure command;
   and, in response to receiving the GW migrate command from the controller, transmit relevant configuration information of the first VXLAN IP GW to the controller to be stored; release the route to the VTEP at the peer end of the VXLAN tunnel, after lowering the priority of the route, which carries the VTEP IP address of the port of the VXLAN tunnel corresponding to the first VXLAN IP GW; and release the static route to the network device in the non-virtual network, after lowering the priority of the static route destined for the VM;
   receive a migration action execute command, when the controller detects that no data flow between the VM and the network device in the non-virtual network passes the first VXLAN IP GW; and
   and execute the migration actions, based on the migration action execute command.

9. A software defined network (SDN)-based gateway (GW) migration processing device, which is applied to a controller in an SDN wherein the SDN-based GW migration processing device at least comprises a processor, a memory and a non-transitory storage medium;
   the non-transitory storage medium is to store machine readable instructions that are executable by a processor, the machine readable instructions comprising a first command transmitting module, a monitoring module and a second command transmitting module;
   the first command transmitting module is to transmit a first configure command and a second configure command to a first virtual extensible local area network (VXLAN) internet protocol (IP) GW to be migrated in at least two VXLAN IP GWs, wherein the first configure command comprises: lowering a priority of a route, which carries an VXLAN tunneling end point (VTEP) IP address of a port of a VXLAN tunnel corresponding to the first VXLAN IP GW; the second configure command comprises: lowering a priority of a static route destined for a virtual machine (VM);
   wherein the at least two VXLAN IP GWs possess a same VTEP IP address of a port of a VXLAN tunnel, before the priority of the route corresponding to the first VXLAN IP GW is lowered, the priority of the route carrying the same VTEP IP address, which is respectively released by each of the at least two VXLAN IP GWs, is the same, and the priority of the static route which is from each of the at least two VXLAN IP GWs to the VM is the same;
   the monitoring module is to monitor whether there is data flow between the VM and a network device in a non-virtual network passing the first VXLAN IP GW; and
   the second command transmitting module is to transmit a migration action execute command to the first VXLAN IP GW, when the monitoring module monitors that no data flow between the VM and the network device in the non-virtual network passes the first VXLAN IP GW.

10. The device according to claim 9, wherein the first command transmitting module is further to transmit a third configure command and a fourth configure command to the first VXLAN IP GW, after the first VXLAN IP GW completes the migration actions and re-joins the SDN,
   wherein the third configure command comprises: restoring the priority of the route, which carries the VTEP IP address of the port of the VXLAN tunnel corresponding to the first VXLAN IP GW, to the priority before being lowered; and
   the fourth configure command comprises: restoring the priority of the static route destined for the VM to the priority before being lowered.

11. The device according to claim 10, wherein the computer executable instructions are further stored in a third command transmitting module, a receiving module and a storing module;
   the third command transmitting module is to transmit a GW migrate command to the first VXLAN IP GW, before the first command transmitting module transmits the first configure command and the second configure command to the first VXLAN IP GW;
   the receiving module is to receive relevant configuration information from the first VXLAN IP GW, after the first VXLAN IP GW receives the GW migrate command;
   the storing module is to store the relevant configuration information of the first VXLAN IP GW, which is received by the receiving module; and
   the first command transmitting module is further to transmit the third configure command and the fourth configure command to the first VXLAN IP GW, based on the relevant configuration information of the first VXLAN IP GW stored by the storing module.

* * * * *